(12) United States Patent
Liu et al.

(10) Patent No.: US 11,386,315 B2
(45) Date of Patent: Jul. 12, 2022

(54) 2D BARCODE ENABLING QUICK AND ACCURATE CODE RECOGNITION AND METHOD FOR CREATING SAME

(71) Applicant: UNI2K Information Technology Co., Ltd., Tongxiang (CN)

(72) Inventors: Shaolei Liu, Tongxiang (CN); Yi Shen, Tongxiang (CN); Nianqing Luo, Tongxiang (CN); Zhehai Zhu, Tongxiang (CN)

(73) Assignee: UNI2K INFORMATION TECHNOLOGY CO., LTD., Tongxiang (CN)

( * ) Notice: Subject to any disclaimer, the term of this patent is extended or adjusted under 35 U.S.C. 154(b) by 0 days.

(21) Appl. No.: 17/421,349

(22) PCT Filed: Jan. 5, 2020

(86) PCT No.: PCT/CN2020/070367
§ 371 (c)(1),
(2) Date: Jul. 7, 2021

(87) PCT Pub. No.: WO2020/143561
PCT Pub. Date: Jul. 16, 2020

(65) Prior Publication Data
US 2022/0067467 A1 Mar. 3, 2022

(30) Foreign Application Priority Data

Jan. 7, 2019 (CN) .......................... 201910010762.2
Jan. 7, 2019 (CN) .......................... 201910010794.2

(51) Int. Cl.
*G06K 7/10* (2006.01)
*G06K 19/06* (2006.01)
*G06K 19/10* (2006.01)

(52) U.S. Cl.
CPC ....... *G06K 19/06037* (2013.01); *G06K 19/10* (2013.01)

(58) Field of Classification Search
CPC ............. G06K 19/06037; G06K 19/10; G06K 7/10881; G06K 7/10386; G06K 2007/10524
See application file for complete search history.

(56) References Cited

U.S. PATENT DOCUMENTS 9,805,296 B2 * 10/2017 Loy .................. G06K 19/06037
2004/0020989 A1 2/2004 Muramatsu
(Continued)

FOREIGN PATENT DOCUMENTS

CN 101093553 A 12/2007
CN 101615259 A 12/2009
(Continued)

*Primary Examiner* — Thien M Le
(74) *Attorney, Agent, or Firm* — IPro, PLLC (57) ABSTRACT

The present invention relates to the field of data identification, and in particular to a two-dimensional code technology. The present invention provides a two-dimensional code drawing method for rapid and accurate identification. The two-dimensional code drawing method comprises cryptographically generating binary input data; determining a layout of a two-dimensional code according to the input data; drawing a positioning point lattice of the two-dimensional code under a designated background; drawing the binary input data into a data area; and cryptographically generating and drawing basic information binary data on a basic data area. The present invention solves the technical problems of low positioning reliability, long identification time consumption low security and difficult mass storage of the two-dimensional code in the prior art, and has accurate positioning, high identification efficiency and strong expansibility.

12 Claims, 6 Drawing Sheets

(56) References Cited

U.S. PATENT DOCUMENTS

| | | | | |
|---|---|---|---|---|
| 2015/0269466 A1* | 9/2015 | Inotay | ............... | G06F 21/6218 |
| | | | | 235/494 |
| 2017/0076127 A1* | 3/2017 | Arce | ............... | G06K 19/06056 |
| 2017/0076191 A1 | 3/2017 | Feng | | |
| 2017/0243097 A1* | 8/2017 | Loy | ..................... | G06K 7/1443 |
| 2017/0286765 A1* | 10/2017 | Rodriguez | ............ | H04L 9/3239 |
| 2018/0288040 A1* | 10/2018 | Kursun | ................ | H04W 12/06 |
| 2019/0163944 A1* | 5/2019 | Lau | ....................... | G06K 19/14 |
| 2019/0279059 A1 | 9/2019 | Feng | | |
| 2020/0110931 A1* | 4/2020 | Saluja | .................. | G06F 16/951 |
| 2020/0293772 A1* | 9/2020 | Rodriguez | ............ | H04L 9/3239 |
| 2021/0240969 A1* | 8/2021 | Edelen | ................ | G06V 40/172 |

FOREIGN PATENT DOCUMENTS

| | | | |
|---|---|---|---|
| CN | 102034127 | A | 4/2011 |
| CN | 102243704 | A | 11/2011 |
| CN | 102509143 | A | 6/2012 |
| CN | 105279539 | A | 1/2016 |
| CN | 204946052 | U | 1/2016 |
| CN | 106529633 | A | 3/2017 |
| CN | 108764420 | A | 11/2018 |
| CN | 109447216 | A | 3/2019 |
| CN | 109740716 | A | 5/2019 |
| TW | 201710957 | A | 3/2017 |
| WO | 2017044777 | A1 | 3/2017 |

\* cited by examiner

2D BARCODE ENABLING QUICK AND ACCURATE CODE RECOGNITION AND METHOD FOR CREATING SAME

TECHNICAL FIELD

The present invention relates to the field of data identification, and in particular to the formation and capture technology of two-dimensional code.

BACKGROUND

The two-dimensional code is especially widely used in high-tech industry, storage and transportation industry and wholesale and retail industry that need to quickly mark the information for the goods. The data identification speed and identification security, and storage capacity of the two-dimensional code are important consideration factors in the development of the two-dimensional code. In addition, the two-dimensional code is usually in the form of a matrix array, and encoding and decoding start from the specified starting point of the matrix array. Accurate and quick reading of the specified starting point is the key to guarantee the success of decoding.

Figure 1:
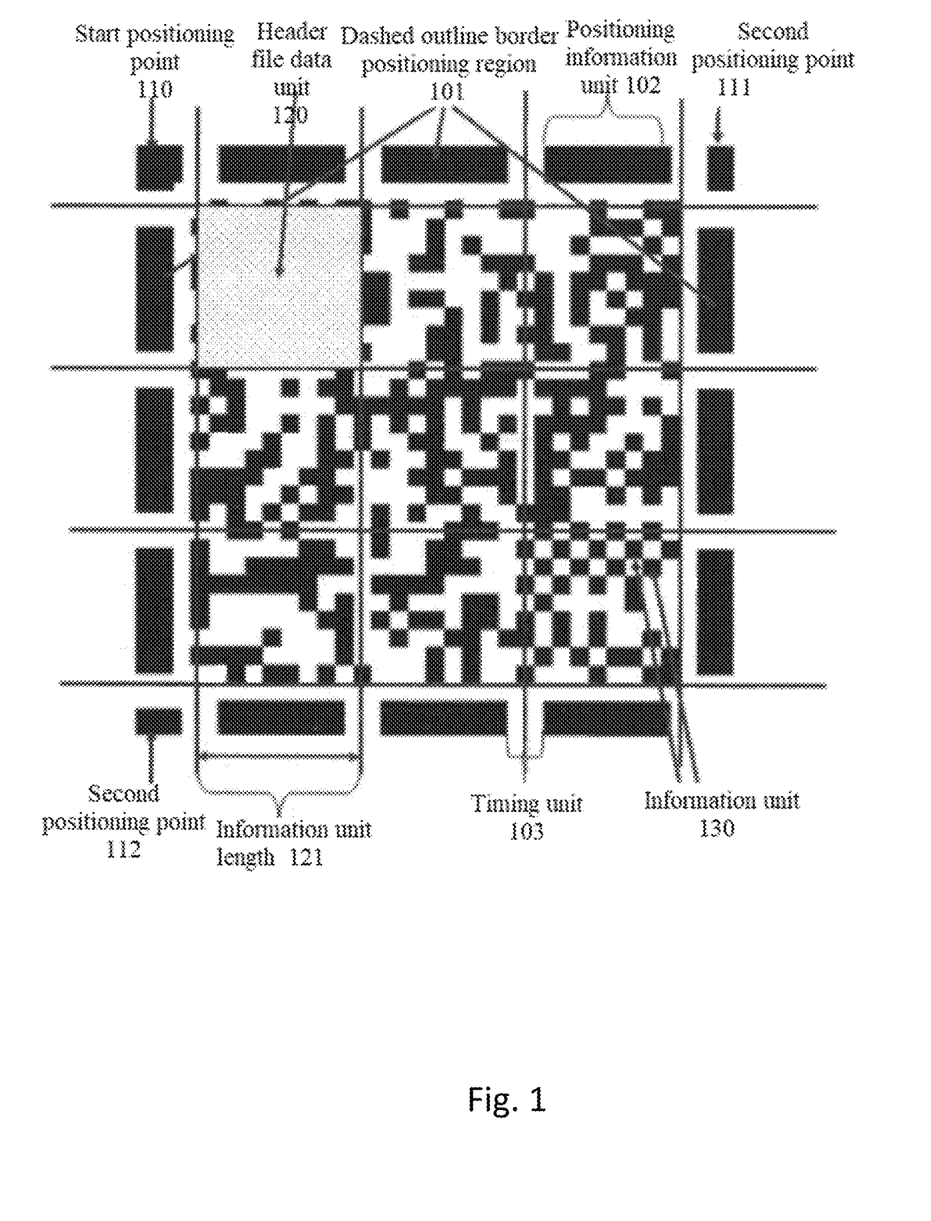
FIG. 1 is a diagram of an example of a two-dimensional code in prior art 1.

The prior art 1 is a Chinese patent application with the patent publication No. CN 102034127 A, and its technical solution is shown in FIG. 1. The application discloses a system for a high-capacity two-dimensional barcode and an encoding method therefor. In the invention, the shape features of positioning points are not obvious enough, and are easy to confuse with other contents, so that it takes a long time in the process of identification and positioning of the positioning points; no auxiliary positioning point is set, so that the calculation error probability is high, i.e., the correctness of information cannot be guaranteed, and the speed of reading cannot be increased; the number of the positioning points is 3; and the positioning points are different in shapes, have no consistency and symmetry in design, and have extremely poor visual effect. The positioning process of the invention is to find three positioning points through four dashed outline borders; the involved image range is large, which increases the difficulty in the positioning process; and there is no image border, which leads to edge data pollution and is not beneficial to pattern identification. Special information areas (header file data unit areas) and other information areas have no structural difference, which ensures the cleanness of the images, but increases the difficulty of data identification. Although the overall information is divided into a plurality of data units, no spacer area is provided between the data units for data protection. The invention has no expansibility and is not conducive to large-capacity storage.

Figure 2:
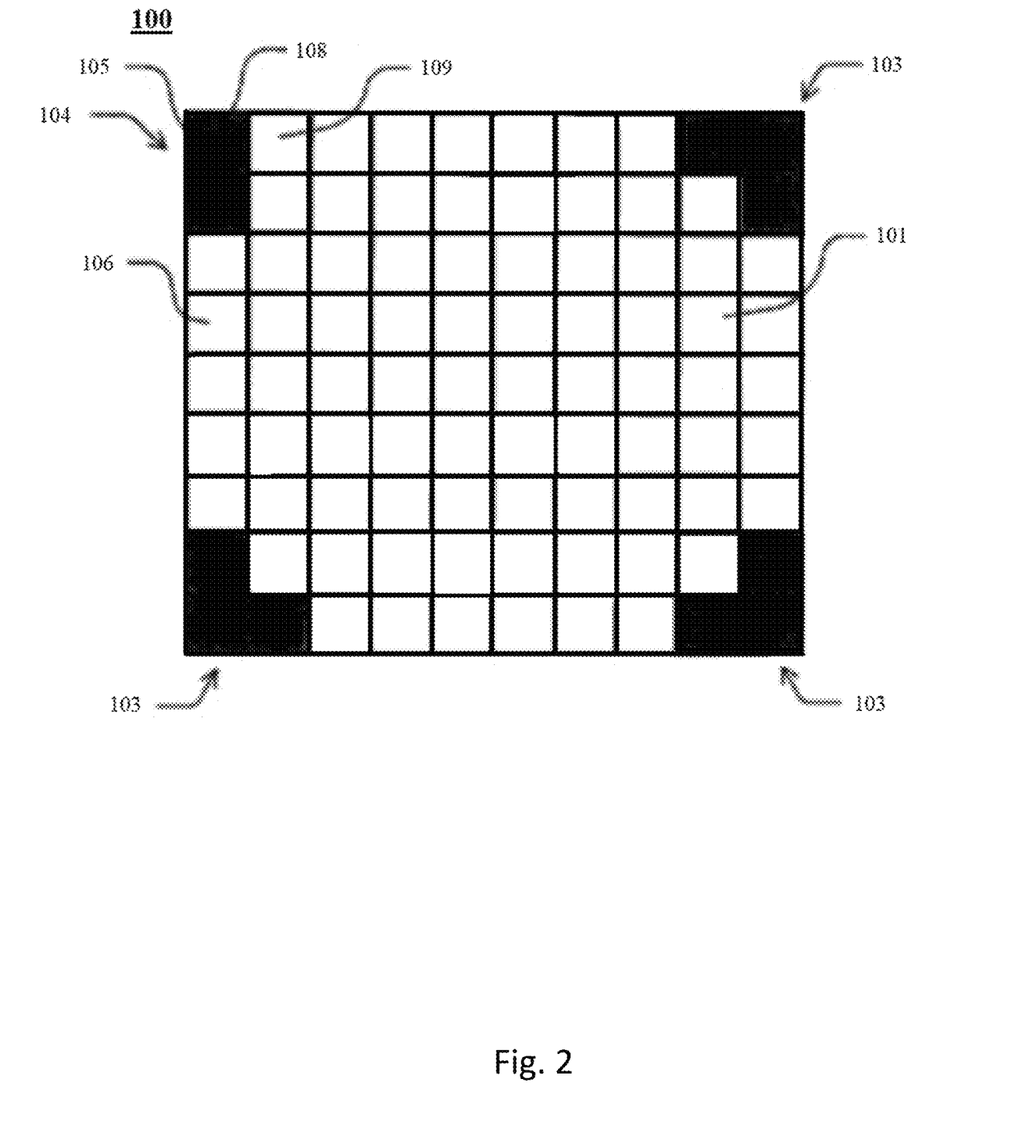
FIG. 2 is a diagram of an example of a two-dimensional code in prior art 2.

The prior art 2 is a Chinese patent application with the patent publication No. CN 102243704 A, and its technical solution is shown in FIG. 2. The application discloses a positioning system for a two-dimensional code and an identification method for a two-dimensional code. In the invention, positioning points are set at four endpoints of the two-dimensional code. However, the shape features of the positioning points are not obvious enough, and are easy to confuse with other contents, so that it takes a long time in the process of identification and positioning of the positioning points; no spacer area is set, which affects the efficiency of positioning and data reading; information partitioning management is not involved, which is not beneficial to the security of data, and affects the reading of data; and there is no image border, which leads to edge data pollution and is not beneficial to pattern identification. The patent also has defects in design of ductility, which is not beneficial to processing large volume data, or causes low efficiency in processing the large volume data.

SUMMARY

In order to solve the technical problems of low positioning reliability, long identification time consumption, low security and difficult mass storage of the two-dimensional code in the prior art, the present invention proposes a two-dimensional code drawing method for rapid and accurate identification comprises:

step 1: cryptographically generating binary input data;

step 2: determining a layout of a two-dimensional code according to the input data;

step 3: drawing a positioning point lattice of the two-dimensional code under a designated background;

step 4: drawing the binary input data into a data area;

step 5: cryptographically generating and drawing basic information binary data on a basic data area.

Preferably, the basic information binary data encrypted and drawn on the basic data area in the step 5 comprises:

binary data of version information, directional information and mask template information.

Preferably, the step 2 comprises:

step 2.1: judging version information according to an input data capacity, and determining the number of main positioning points and auxiliary positioning points and the number of data areas;

step 2.2: calculating the number of information areas in each data area according to the input data and the version information of the two-dimensional code;

step 2.3: comprehensively calculating the version information of the two-dimensional code and the number data of the information areas to obtain an overall layout of the two-dimensional code.

Preferably, the step 4 comprises:

step 4.1: setting flow lines according to the data areas, drawing the input data into each information area in sequence, and reserving a spacer area between the data areas;

step 4.2: randomly or specifically selecting a mask template in a database, and conducting mask processing on each data area and camouflage isolation area.

Preferably, in the step 4.1, the flow lines are drawn in different data areas in different sequences.

Preferably, the two-dimensional code is used for information authentication of offline state or non-networked state.

Preferably, the two-dimensional code is used for identification of credentials, and the credentials comprise: licenses, business cards and nameplates.

Preferably, the two-dimensional code is used for identification of financial documents, and the financial documents comprise: insurance policies, bills, traffic tickets and financial statements.

Preferably, the two-dimensional code is used for identification of announcements, and the announcements comprise: legal documents, certificates, specifications, product packaging, advertisements and printed matter.

A two-dimensional code for fast and accurate recognition comprises:

Coding area,

The coding region comprises four centrosymmetric major fixing sites at four vertices of the coding region, And multiple data areas;

The main positioning point and a space area outside the coding area.

The coding area also includes an axisymmetric equidistant setting auxiliary positioning point on the side line of the coding area.

Preferably, the data area comprises:

2N type I data areas of equal size separated by positioning points in the vertical direction, 2M type II data areas of equal size separated by positioning points in horizontal direction, and P type III data areas adjacent to type I data areas and type II data areas.

Preferably, the length of type III data areas is equal to the length of type II data areas, and the width of type III data areas is equal to the width of type I data areas.

Preferably, the data area further comprises a plurality of basic data areas arranged along the outer edge of the coding area, and the basic data area comprises two-dimensional code version information, parameter information, and orientation information.

Preferably, the basic data area comprises a first basic data area located at an upper edge and a right edge of the coding area, and a second basic data area located at a lower edge and a left edge of the coding area; The first basic data area is symmetrical with the second basic data area in the center and has the same data content, or, the basic data area includes the first basic data area located at the upper edge and left edge of the coding area, and the second basic data area located at the lower edge and right edge of the coding area; The first basic data area is symmetrical with the second basic data area in the center, and the stored data content is the same.

Preferably, the two-dimensional code also comprises: a border contour area for reducing data pollution; the camouflage isolation area is separated from different data areas; the multiple data areas and the camouflage isolation areas are masked.

Preferably, the auxiliary positioning points are even number; the positioning point is snowflake shaped; a positioning interval area is arranged around the positioning point.

Preferably, the two-dimensional code is used for information authentication of offline state or non-networked state.

DETAILED DESCRIPTION

The technical solution in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

In view of the fact that the existing methods cannot realize efficient, high-precision and large-capacity two-dimensional code drawing or identification, embodiments of the present invention provide a two-dimensional code drawing method with accurate positioning, high identification efficiency and strong expansibility. The present invention will be described in detail below in combination with the drawings.

Embodiment 1

Figure 3:
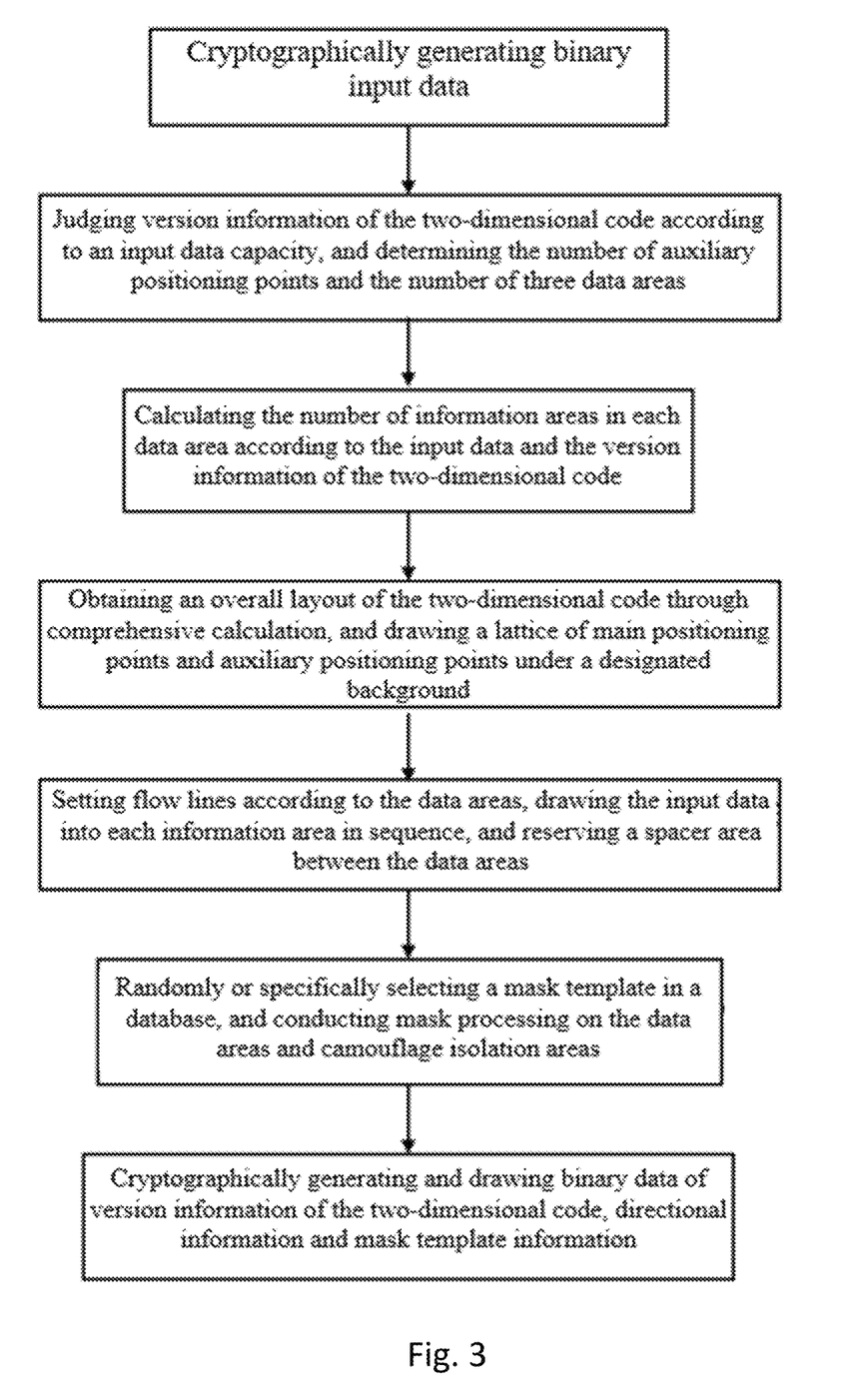
FIG. 3 is a flow chart of a two-dimensional code drawing method provided in embodiment 1 of the present invention.

The present embodiment provides a two-dimensional code drawing method for rapid and accurate identification, as shown in FIG. 3, comprising:

step 1: cryptographically generating binary input data;

step 2: judging version information of the two-dimensional code according to an input data capacity, and determining the number of auxiliary positioning points and the number of first data areas, second data areas and third data areas;

step 3: calculating the number of information areas according to the input data and the version information of the two-dimensional code;

step 4: comprehensively calculating the version information of the two-dimensional code and the number data of the information areas to obtain an overall layout of the two-dimensional code; drawing a positioning point lattice under a designated background, comprising main positioning points and auxiliary positioning points;

step 5: setting flow lines according to the data areas, drawing the input data into each information area in sequence, and reserving spacer areas;

step 6: randomly or specifically selecting a mask template in a database, and conducting mask processing on each data area and camouflage isolation area;

step 7: cryptographically generating and drawing binary data of version information of the two-dimensional code, directional information and mask template information on a basic data area.

The present embodiment comprehensively calculates the version information of the two-dimensional code and the number of the information areas through the input data, and then draws the two-dimensional code to optimize the data capacity. The present embodiment has expansibility and uses large-capacity storage. The directional information generated and drawn through encryption determines the overall direction of data decoding, and then determines downstream reading or upstream reading of the flow lines of the data areas, wherein downstream reading can parse data, and upstream reading fails to parse the data. The design increases the security of the data to a certain extent.

Embodiment 2

Figure 4:
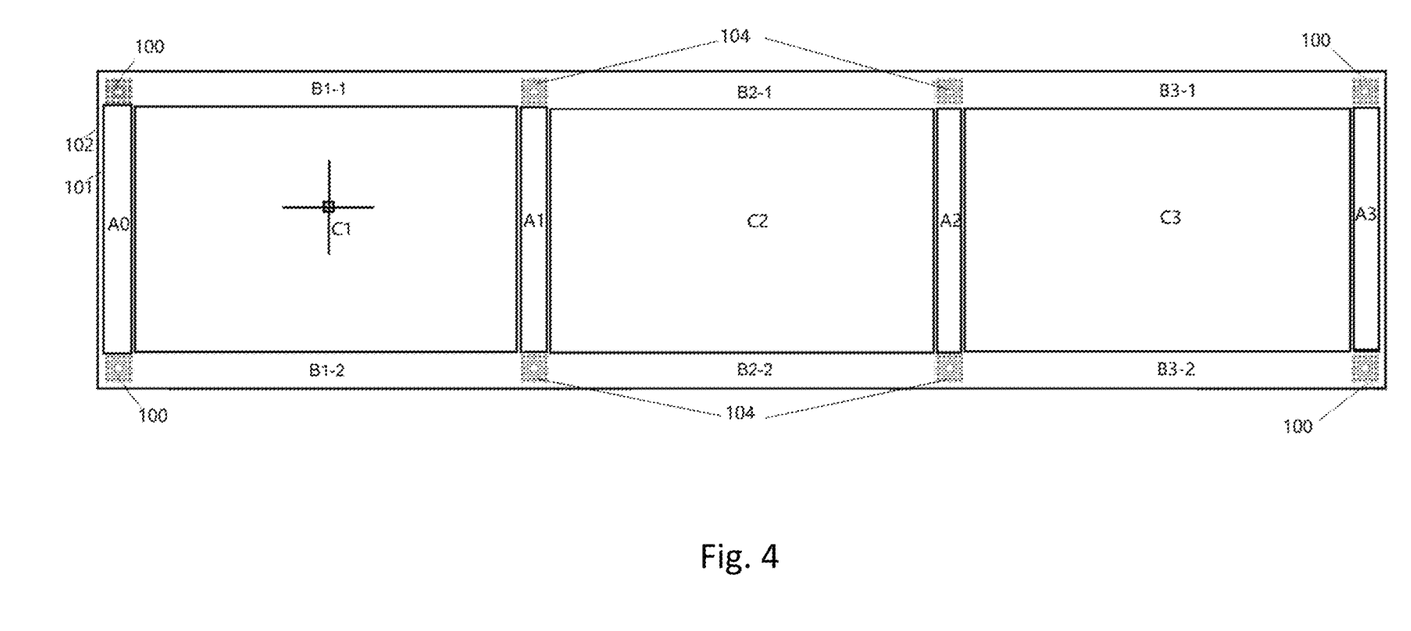
FIG. 4 is an overall example diagram of the two-dimensional code provided by the second embodiment of the present invention.
Figure 5:
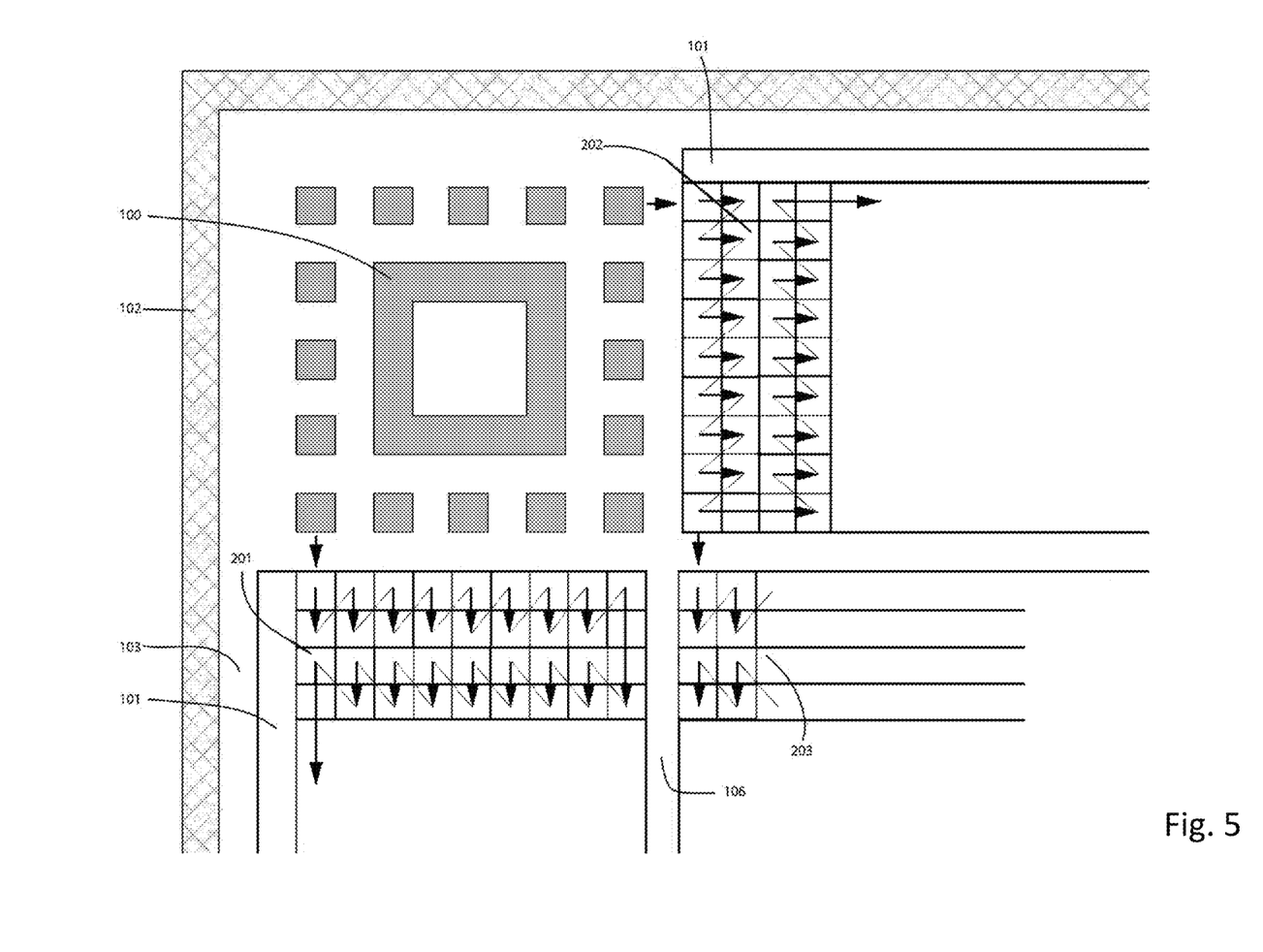
FIG. 5 is a partial example diagram of the two-dimensional code provided by the second embodiment of the present invention.
Figure 6:
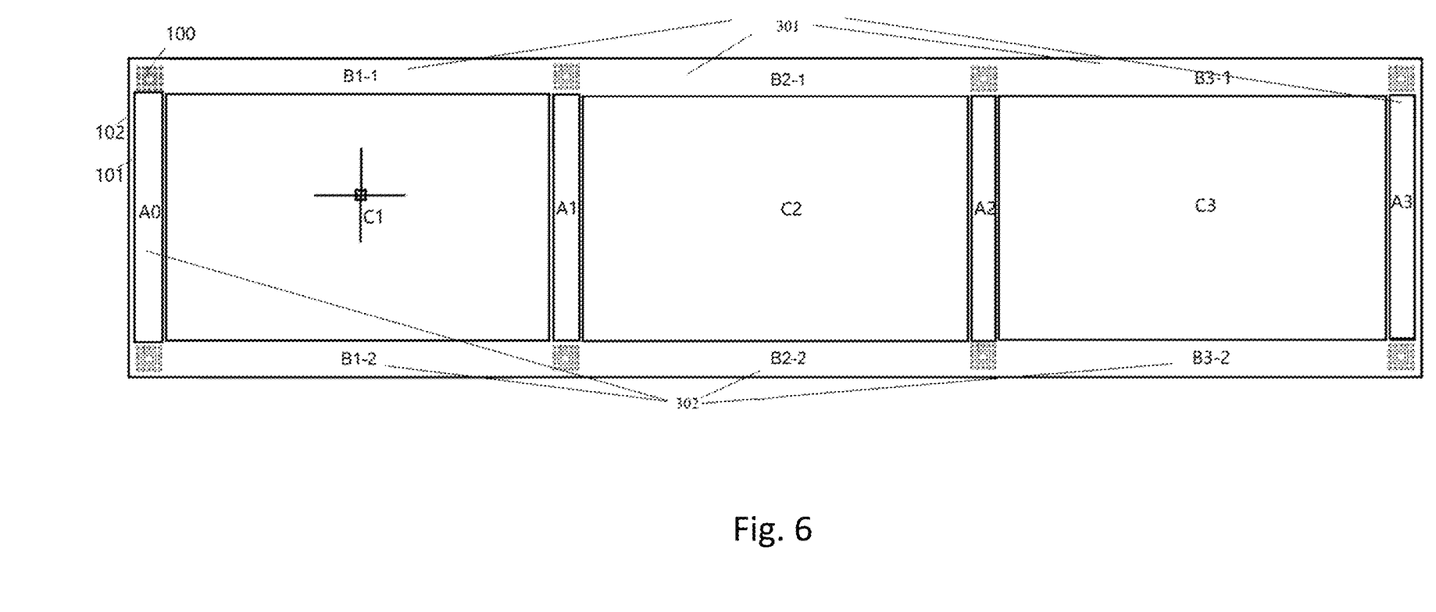
FIG. 6 is an example diagram of the basic information area of the two-dimensional code provided by the second embodiment of the present invention.

This embodiment provides a two-dimensional code for fast and accurate recognition, as shown in FIG. 4-6, comprises: a border contour area 102 for reducing data pollution, a coding area, and a main interval area 103 between the border contour area and the coding area; The coding area comprises four centrosymmetric main locating points 100 located at four vertices of the coding area, a plurality of data areas and camouflage isolation areas 106 separated by different data areas. The coding area further comprises four auxiliary positioning points 104 arranged at an axisymmetric equidistant distance on the side line of the coding area, and positioning interval areas are arranged around the main positioning points 100 and the auxiliary positioning points 104. The data area comprises: six type II data areas B1-1, BI-2, B2-I, B2-2, B3-1, B3-2 of equal size which are located between the upper and lower edge lines of the coding area and separated by the auxiliary positioning points, two type I data areas A0, A3 of equal size which are located between the two positioning points which are axisymmetric in the horizontal direction, and two type I internal data areas AI, A2, And three type III data areas CI, C2, C3 of equal size sandwiched between the type I data areas and the type II data areas. the length of the type III data areas is equal to the length of the type II data areas, and the width of the type III data areas is equal to the width of the type I data areas. The data area further comprises: two basic data areas 101 arranged along the extension of the side line of the coding area, the basic data area comprises a type I data area 301 located on the extension of the upper side line and the right side line of the coding area, and a type II data area 302 located on the extension of the lower side line and the left side line of the coding area; The type I data area is symmetrical with the type II data area in the center, and the stored data content is the same.

The two-dimensional code structure of this embodiment includes four main locating points 100 and four auxiliary locating points 104, which have the same shape and are centrosymmetric snowflake shape. Snowflake has obvious characteristics different from other data areas, which can effectively distinguish the location point and data area, and improve the location efficiency. The main location points are distributed at four vertices of the coding area, and the auxiliary location points are evenly distributed along the frame of the two-dimensional code. In order to maximize the data capacity, there is no positioning point except the fixed point and sideline of the coding area.

The dark border 102 set in the peripheral coding area can effectively reduce the data pollution.

The basic data area 101 mainly contains the two-dimensional code version information, various parameter information, and orientation information. And the information is divided into two sets, which are stored in the upper right area of the two-dimensional code and the lower left area of the two-dimensional code. As shown in FIG. 5, the type I data area 301 is located in the upper layer, and the type II data area 302 is located in the lower layer, both of which are symmetrical. The basic data area, while providing the basic information, realizes the orientation of the two-dimensional code, ensures the realization of the overall function, and is directly related to the accuracy and success of data identification.

In order to improve the efficiency of data recognition and analysis, the data area is divided into data zones. As shown in FIG. 4, the data area is divided into three areas: the type I data area, the type II data area, and type III data area and camouflage interval area 106 is set between each partition. The setting of camouflage interval reduces the recognition error, reduces the information interference and improves the success rate of two-dimensional code recognition. The number of three data areas is directly related to the input data capacity. The partition solves the problem of optimizing the large data capacity and is conducive to the capacity expansion. The first type information area 201, the second information area 202 and the third type information area 203 with different arrangement order are set in different data areas. The difference of the arrangement order between different data areas and the consistency of the arrangement order between the same data areas can speed up the data reading speed and ensure the data security.

To sum up, the two-dimensional code drawing method provided in embodiments of the present invention has the following beneficial effects:

In the positioning mode of the encryption pattern of the present invention, an alabastrine centrosymmetric positioning pattern is adopted, so that the reliability of positioning is enhanced, and the parsing identification rate is improved.

The main and auxiliary positioning points in the encryption pattern of the present invention are designed into axisymmetric images, which reduces the error of image processing and accelerates data parsing.

The basic data in the encryption pattern of the present invention is divided into upper and lower layers of information, which can play the role of orientation and is the guarantee of the parsing process.

A data partitioning method in the encryption pattern of the present invention comprises the partitioning and arrangement of the information areas in the data areas, which improves the identification efficiency on the premise of ensuring the data security.

The light-colored spacers in the encryption pattern of the present invention can avoid data pollution, protect the integrity of data of the positioning points and directly improve the success rate of data parsing.

The encryption pattern of the present invention forms a beautiful centrosymmetric pattern by the combination of the above parts.

The purposes, technical solutions and beneficial effects of the present invention are further described in detail through the above specific embodiments. It shall be understood that the above only describes specific embodiments of the present invention and is not intended to limit the protection scope of the present invention. Any modification, equivalent replacement, improvement, etc. made within the spirit and the principle of the present invention shall be included within the protection scope of the present invention.

What is claimed is:

1. A method comprising:
   step 1: cryptographically generating binary input data;
   step 2: determining a layout of a two-dimensional code according to the binary input data;
   step 3: drawing a positioning point lattice of the two-dimensional code under a designated background;
   step 4: drawing the binary input data into one or more data areas;
   step 5: cryptographically generating and drawing basic information binary data on a basic data area;
   wherein the basic information binary data comprise binary data of version information, directional information and mask template information; or
   wherein, the step 2 comprises: determining version information according to an input data capacity, and determining a number of main positioning points and auxiliary positioning points and a number of the data areas, calculating a number of information areas in each of the data areas according to the binary input data and the version information, and obtaining an overall layout of the two-dimensional code by calculating the version information o and the number of the information areas; or
   wherein the step 4 comprises setting a pipeline for each of the data areas, drawing the binary input data into each information area in sequence, and reserving a spacer area between the data areas and selecting a mask template, conducting mask processing on each of the data areas and a camouflage isolation zone.

2. The method according to claim 1, wherein, the order of the pipeline is different for different data areas.

3. The method according to claim 1, wherein the two-dimensional code is used for information authentication of offline state or non-networked state.

4. The method according to claim 1, wherein the two-dimensional code is used for identification of credentials, and the credentials comprise:
licenses, business cards and nameplates.

5. The method according to claim 1, wherein the two-dimensional code is used for identification of financial documents, and the financial documents comprise: insurance policies, bills, traffic tickets and financial statements.

6. The method according to claim 1, wherein, the two-dimensional code is used for identification of announcements, and the announcements comprise: legal documents, certificates, specifications, product packaging, advertisements and printed matter.

7. A two-dimensional code comprising:
a coding area, comprising four centrosymmetric major fixing sites at four vertices of the coding area and axisymmetric equidistant auxiliary positioning points located on a side line of the coding area;
multiple data areas; and
a main positioning point and a space area outside the coding area;
wherein the two-dimensional code further comprises a border contour area for reducing data pollution and a camouflage isolation area separated from the data areas, and the data areas and the camouflage isolation areas are masked; or wherein a number of the auxiliary positioning points is even, the auxiliary positioning points are snowflake shaped, and the two-dimensional code comprises a positioning interval area arranged around the auxiliary positioning points.

8. The two-dimensional code according to claim 7, wherein, the data areas include:
2N type I data areas of equal size separated by positioning points in a vertical direction,
2M type II data areas of equal size separated by positioning points in a horizontal direction, and
P type III data areas adjacent to the type I data areas and the type II data areas.

9. The two-dimensional code according to claim 7, wherein a length of the type III data areas is equal to a length of the type II data areas, and a width of the type III data areas is equal to a width of the type I data areas.

10. The two-dimensional code according to claim 7, wherein the data areas further comprises a plurality of basic data areas arranged along an outer edge of the coding area, and the basic data areas comprise two-dimensional code version information, parameter information, and orientation information.

11. The two-dimensional code according to claim 10,
wherein, the basic data area includes a first basic data area located at an upper edge and a right edge of the coding area, a second basic data area located at a lower edge and a left edge of the coding area, and the first basic data area is symmetrical with the second basic data area and has the same data content with the second basic data area; or
wherein the basic data area includes the first basic data area located at the upper edge and left edge of the coding area, the second basic data area located at the lower edge and right edge of the coding area, and the first basic data area is symmetrical with the second basic data area and has the same data content with the second basic data area.

12. The two-dimensional code according to claim 7, wherein the two-dimensional code is used for information authentication of offline state or non-networked state.

* * * * *